(12) United States Patent
Bischel

(10) Patent No.: US 7,973,445 B2
(45) Date of Patent: Jul. 5, 2011

(54) LAMINATED ROTARY ACTUATOR WITH THREE-DIMENSIONAL FLUX PATH

(75) Inventor: Kevin Allen Bischel, Algonquin, IL (US)

(73) Assignee: Woodward Controls Inc., Niles, IL (US)

( * ) Notice: Subject to any disclaimer, the term of this patent is extended or adjusted under 35 U.S.C. 154(b) by 246 days.

(21) Appl. No.: 12/013,751

(22) Filed: Jan. 14, 2008

(65) Prior Publication Data

US 2009/0058218 A1 Mar. 5, 2009

Related U.S. Application Data

(60) Provisional application No. 60/968,984, filed on Aug. 30, 2007.

(51) Int. Cl.
*H02K 1/06* (2006.01)

(52) U.S. Cl. .......... 310/162; 310/166; 310/216.004; 310/254.1; 310/216.057; 310/216.075

(58) Field of Classification Search ............ 310/49.08, 310/49.19, 49.43, 162–164, 166, 216.004, 310/216.055, 216.066, 216.075, 216.118, 310/216.122, 268, 254.1, 216.057, 261.1
See application file for complete search history.

(56) References Cited

U.S. PATENT DOCUMENTS

| | | | | | |
|---|---|---|---|---|---|
| 606,863 | A | * | 7/1898 | Guttmann | 310/168 |
| 2,107,872 | A | * | 2/1938 | Nisbet | 310/216.017 |
| 2,560,560 | A | * | 7/1951 | Doherty | 310/216.023 |
| 3,510,699 | A | * | 5/1970 | Fredrickson | 310/49.43 |
| 4,999,531 | A | * | 3/1991 | Mavadia et al. | 310/23 |
| 5,485,046 | A | * | 1/1996 | Kaplan et al. | 310/166 |
| 6,952,068 | B2 | * | 10/2005 | Gieras et al. | 310/254.1 |
| 7,071,683 | B2 | * | 7/2006 | Shimomura et al. | 324/207.25 |
| 7,081,698 | B1 | * | 7/2006 | Burkholder et al. | 310/261.1 |
| 7,436,094 | B2 | * | 10/2008 | Zhao | 310/154.22 |
| 2007/0063591 | A1 | * | 3/2007 | Yasuda | 310/49 R |
| 2007/0126310 | A1 | * | 6/2007 | Tang et al. | 310/216 |

* cited by examiner

*Primary Examiner* — Tran N Nguyen
(74) *Attorney, Agent, or Firm* — Ziolkowski Patent Solutions Group, SC

(57) ABSTRACT

A rotary actuator includes a stator assembly positioned within an outer enclosure. A rotor assembly is positioned adjacent to the stator and is configured to rotate relative thereto and about a centerline axis of the rotary actuator. Each of the outer enclosure, the stator assembly, and the rotor assembly are arranged to carry a magnetic flux therethrough and form a flux path loop, such that as a magnetic flux flows through the outer enclosure, the stator assembly, and the rotor assembly, a torque is generated by rotation of the rotor assembly relative to the stator assembly.

11 Claims, 4 Drawing Sheets

LAMINATED ROTARY ACTUATOR WITH THREE-DIMENSIONAL FLUX PATH

CROSS-REFERENCE TO RELATED APPLICATION

The present application claims priority to provisional U.S. Patent Application No. 60/968,984, filed on Aug. 30, 2007.

BACKGROUND OF THE INVENTION

The present invention relates generally to electromagnetic actuators, and more particularly, to a rotary actuator having a flux path formed in part by a plurality of stamped laminations.

The desirability of and need for a rotary electromagnetic actuators has been recognized for years. A factor in the effectiveness of rotary electromagnetic actuators is the ability of the actuator to convert electromagnetic forces into useful output torque. That is, the efficiency of the actuator in converting electromagnetic forces into useful output torque is of primary importance. One primary factor in converting electromagnetic forces into useful output torque is the creation of an efficient flux path that allows magnetic flux to easily flow between components of the actuator with minimal reluctance.

Typically, rotary actuators include a stator machined from steel with magnetic properties that allows flux to move in any direction through the steel. Such a one-piece construction of the stator results in an efficient motor design. As shown in FIG. 1, a prior art rotary actuator 100 includes a solid, machined stator 102 that is positioned adjacent to a rotor 104 such that magnetic flux moves through three sides of the solid stator 102 and through the rotor 104, as is shown by magnetic flux path 106. That is, the magnetic flux travels through a stator outer post 108, across rotor 104, down a stator center post 110, across a lower lateral section of stator 102, and back to stator outer post 108 via a connecting portion 112. While such a construction does provide a relatively efficient flux path, it requires that stator 102 be formed as a complex part. Such complex stator designs that are machined from steel are time consuming to produce and result in an increased part cost. That is, with this type of construction, the stator is machined from a single piece of bar stock. Not only is it time consuming to machine such a piece, the initial material costs are relatively high. With increasing labor and material costs, this construction can become prohibitively expensive.

Therefore, a need exists for a stator design that is efficiently constructed and cost effective, while providing a magnetic flux path having low reluctance so as to maximize the ability of the actuator to convert electromagnetic forces into useful output torque.

BRIEF DESCRIPTION OF THE INVENTION

The present invention overcomes the aforementioned problems by providing a system and method of forming a rotary actuator having a flux path formed, in part, by a plurality of stamped laminations. A stator assembly and/or rotor assembly in the rotary actuator include a plurality of stamped laminations positioned and oriented such that a magnetic flux path is formed having low reluctance, so as to maximize the ability of the rotary actuator to convert electromagnetic forces into useful output torque.

In accordance with one aspect of the present invention, a rotary actuator includes an outer enclosure and a stator assembly positioned within the outer enclosure. The rotary actuator also includes a rotor assembly positioned adjacent to the stator and configured to rotate relative thereto and about a centerline axis of the rotary actuator. Each of the outer enclosure, the stator assembly, and the rotor assembly are arranged to carry a magnetic flux therethrough.

In accordance with another aspect of the present invention, an electric motor includes an outer enclosure, a stator ring positioned within the outer enclosure, and an electromagnetic coil positioned adjacent the stator ring and within the outer enclosure. The electric motor also includes a flux ring positioned within the outer enclosure and oppositely from the stator ring and a rotor assembly positioned within the stator ring, the coil arrangement, and the flux ring. The rotor assembly is configured to rotate about a centerline axis of the electric motor and relative to the stator ring and the flux ring in response to a magnetic flux generated by the electromagnetic coil.

In accordance with yet another aspect of the present invention, a method for manufacturing a rotary actuator includes the steps of constructing a tube shaped outer housing and forming a stator assembly and a rotor assembly configured to be positionable within the outer housing, wherein at least one of the stator assembly and the rotor assembly are formed at least in part from a plurality of metallic laminations. The method also includes the step of positioning the stator assembly and the rotor assembly within the outer housing, with the stator assembly being separated from the rotor assembly by a working air gap such that the rotor assembly can rotate relative to the stator assembly to generate an output torque.

In accordance with still another aspect of the present invention, a rotary actuator includes a multi-piece stator arrangement and a rotor assembly positioned adjacent to the multi-piece stator arrangement configured to rotate relative thereto and about a centerline axis of the rotary actuator. A torque is generated by flow of a magnetic flux through the multi-piece stator arrangement and the rotor assembly.

Various other features and advantages of the present invention will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION OF THE PREFERRED EMBODIMENT

Figure 2:
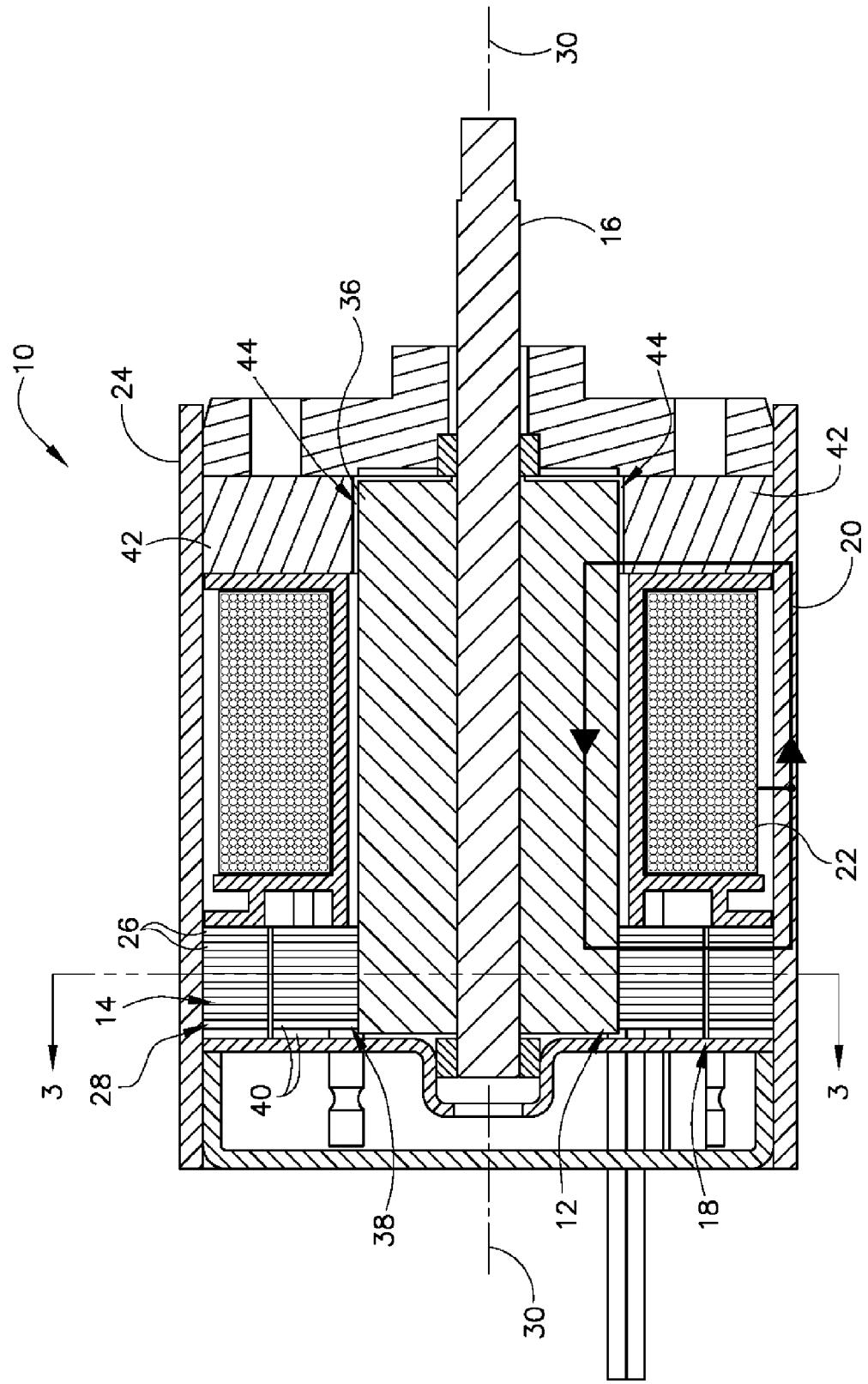
FIG. 2 is a cross-sectional view of a rotary actuator according to an embodiment of the present invention.

Referring to FIG. 2, an embodiment of an electromagnetic motor 10 is shown according to the invention. As shown in FIG. 2, electromagnetic motor 10 comprises an actuator of the "rotational" type, wherein a rotor assembly 12 alternately rotates about an axis 30 relative to a stator assembly 14 as the excitation of an associated electromagnetic coil is varied. The rotary actuator 10 can comprise a fractional or limited angle torquer (LAT) which converts an input current to a proportionally related rotary output position of an output shaft 16. That is, rotary actuator 10 is configured such that rotor assembly 12 rotates relative to stator assembly 14 within a predetermined range of rotation that is less than 360 degrees.

Rotor assembly 12 is journaled to alternately rotate about axis 30 relative to the stator assembly 14, such that a working gap 18 (i.e., a critical air gap) is maintained between the two components to form part of a magnetic flux path 20. A coil assembly 22 is disposed within the rotary actuator 10 to create an excitation current. The excitation current creates a magnetomotive force (m.m.f.) to drive magnetic flux in the closed magnetic flux path 20 which includes the working air gap 18. Such magnetic flux attracts the rotor assembly 12 toward the stator assembly 14, according to well known principles of magnetism, and tends thus to urge the rotor assembly 12 either clockwise or counterclockwise to create a working torque output.

The rotary actuator 10 also includes an outer enclosure 24 (i.e., housing tube) having a hollow interior. The outer enclosure 24 houses the rotor assembly 12 and stator assembly 14 therein. Outer enclosure 24 is formed of a metallic material (e.g., steel) having a desirable magnetic reluctance value so as to form part of magnetic flux path 20. Outer enclosure 24, in combination with stator assembly 14, in effect forms a "multi-piece stator arrangement" through which the magnetic flux flows. Outer enclosure 24 also functions to effectively seal off rotor assembly 12 and stator assembly 14 from the ambient environment. As shown in FIG. 2, the combination of the outer enclosure 24, the stator assembly 14 and the rotor assembly 12 forms a three-dimensional flux path 20 in the rotary actuator 10. The flux flows through in the outer enclosure 24 and continues through the stator assembly 14, into the rotor assembly 12, and eventually back to outer enclosure 24.

As shown in FIG. 2, stator assembly 14 of the present invention is not formed as a single, solid machined piece, but instead is comprised of a plurality of stator laminations 26. The stator laminations 26 can be formed via a stamping process or in one of several other known techniques for producing metallic laminations. The plurality of stator laminations 26 are pressed and affixed together to form a stator lamination stack 28 that is fitted within outer enclosure 24 and positioned adjacent to rotor assembly 12. As set forth above, a working air gap 18 is maintained between stator lamination stack and rotor assembly 12 to allow for rotor assembly 12 to rotate relative to stator assembly 14 and create a working torque output. The size of the working air gap 18 is such that a reluctance of the air gap accounts for a minimal gain in reluctance that would impede flow of the magnetic flux flowing through flux path 20. As such, working air gap 18 can have a thickness of, for example, 0.008 inches (0.203 mm), although other suitable thicknesses are also envisioned.

Each of the plurality of stator laminations 26 is positioned such that they are oriented orthogonally to a centerline axis 30 of the rotary actuator 10 and outer enclosure 24. That is, as shown in more detail in FIG. 3, stator laminations 26 are oriented such that lamination faces 32 of each stator lamination 26 are oriented orthogonally to centerline axis 30. Such an orientation allows for the magnetic flux carried in the three-dimensional flux path to flow from the outer enclosure 24, through each of the plurality of stator laminations 26 in a direction, indicated by arrow 34, parallel to the lamination face 32 and into the rotor assembly 12, such that a minimal amount of reluctance is encountered. That is, the reluctance encountered by the magnetic flux traveling parallel with (and through) each stator lamination 26 optimizes the magnetic material properties of the metallic stator lamination 26. As compared to forming a flux path in which the flux passes perpendicularly through a plurality of laminations stacked on one another and through the lamination-air interfaces present between each pair of laminations, such an orthogonal orientation provides for a much more efficient flux path between the outer enclosure 24 and the rotor assembly 12 than shown in FIG. 1.

Figure 3:
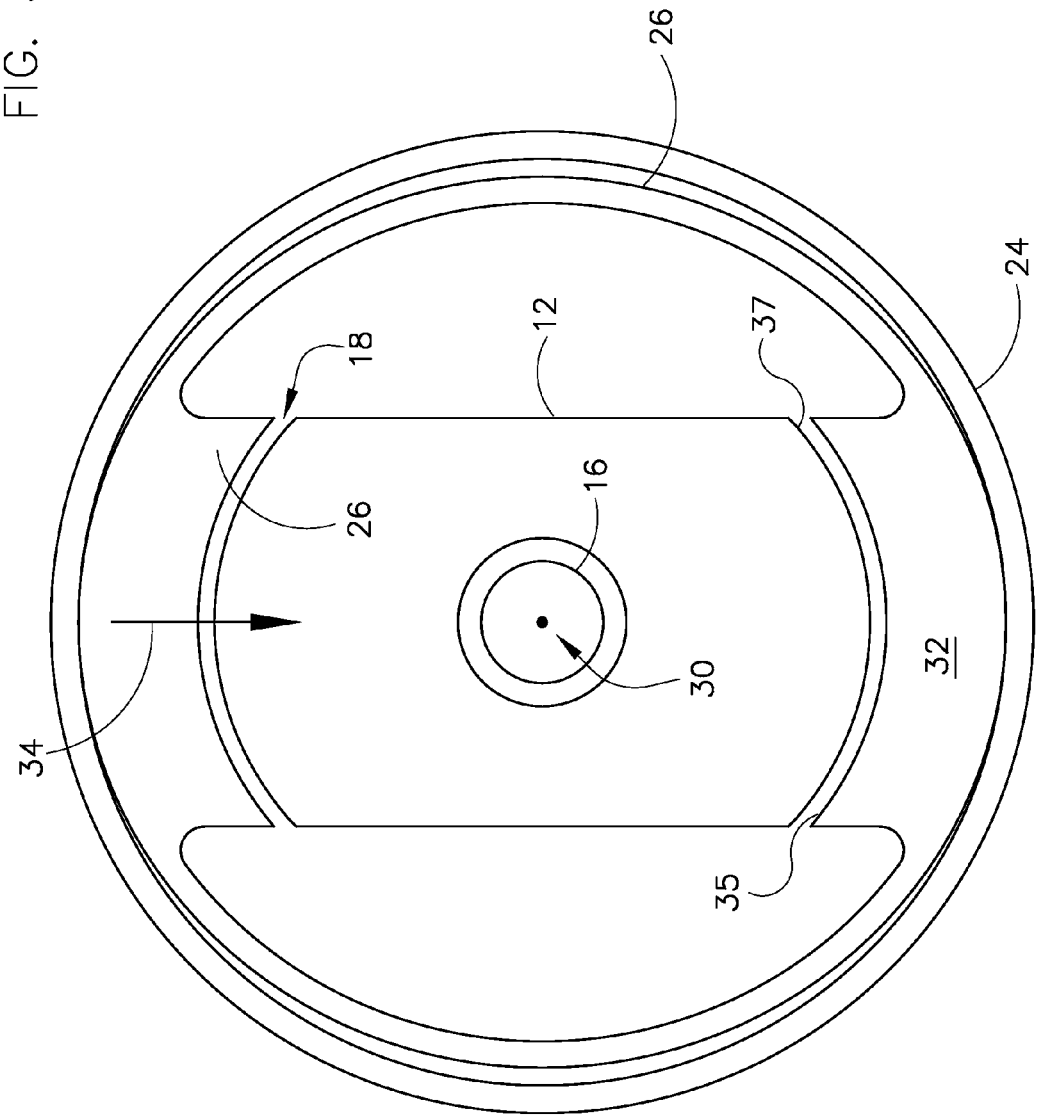
FIG. 3 is an end cross-sectional view of the rotary actuator taken along line 3-3 of FIG. 2.

As shown in FIG. 3, stator lamination 26 includes two oppositely positioned pole faces 35 thereon. The pole faces 35 are aligned with a face 37 on rotor assembly 12 and is separated therefrom by working air gap 18. Such an arrangement allows for angularly limited rotation between the stator assembly 14 (shown in FIG. 2) and rotor assembly 12.

Referring again to FIG. 2, rotor assembly 12 is shown as including a rotor core 36 and a rotor lamination stack 38 that is comprised of a plurality of rotor laminations 40. When rotor assembly is formed from rotor core 36 and rotor lamination stack 38, the rotor lamination stack 38 can be press-fit to rotor core 36 to secure it thereto. Rotor lamination stack 38 is positioned on rotor core 36 such that it is positioned parallel to, and in-line with stator lamination stack 28. As shown in FIG. 2, working air gap 18 separates rotor lamination stack 38 and stator lamination stack 28 such that magnetic flux flowing therebetween in flux path 20 attracts the rotor assembly 12 toward the stator assembly 14 to create rotation therebetween and generate a working torque output.

Also forming a part of rotary actuator 10 in the embodiment of FIG. 2 is a flux ring 42. In the embodiment of FIG. 2, flux ring 42 comprises a solid flux ring that is positioned within outer enclosure 24 and adjacent to rotor core 36 on an opposite end of rotary actuator 10 from the lamination stacks 28, 38. A flux ring air gap 44 is maintained between solid flux ring 42 and rotor core 36 to allow for rotation of the rotor assembly 12, while still providing an electromagnetic connection between rotor assembly 12 and solid flux ring 42. Solid flux ring 42 thus forms part of magnetic flux path 20, along with the outer enclosure 24, stator assembly 14, and rotor assembly 12. In summation, these components form a three dimensional flux path loop that optimizes the material efficiencies of each component, thus minimizing reluctance in the flux path 20 to produce a high torque density output from rotary actuator 10.

Figure 4:
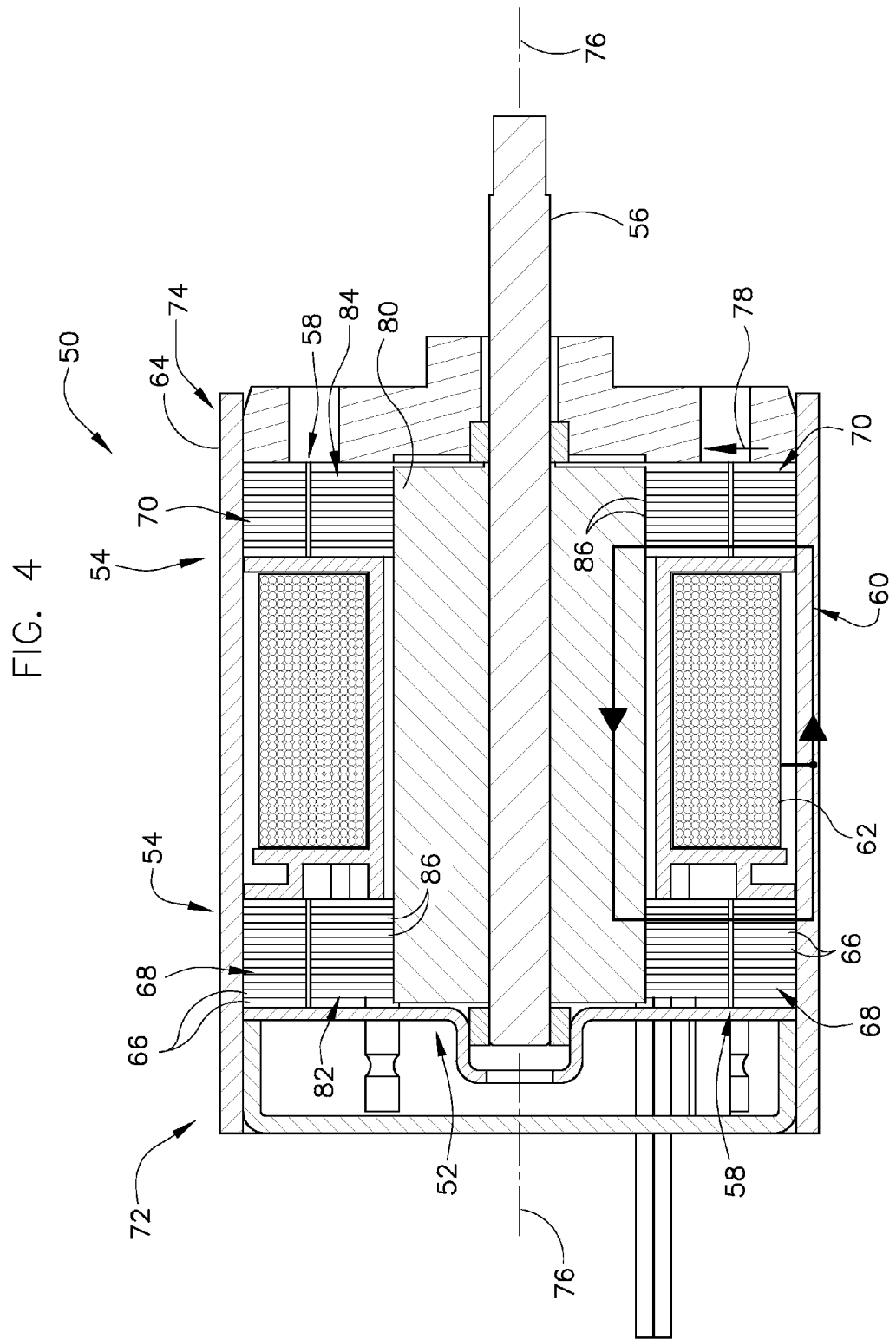
FIG. 4 is a cross-sectional view of a rotary actuator according to another embodiment of the present invention.

Referring now to FIG. 4, another embodiment of a rotary actuator 50 is provided according to the invention. Rotary actuator 50 is designed to produce a torque output that is increased as compared to the torque output generated by the rotary actuator 10 shown in FIG. 3. As shown in FIG. 4, rotary actuator 50 includes a rotor assembly 52 journaled to alternately rotate about an axis 76 relative to a stator assembly 54. An input current is provided to rotary actuator 50, such that an output shaft 56 transmits a torque that is generated when rotor assembly 52 rotates relative to stator assembly 54. A working gap 58 (i.e., a critical air gap) is maintained between the two components to form part of a magnetic flux path 60. A coil assembly 62 is disposed within the rotary actuator 50 to create an excitation current and generate magnetic flux in the closed magnetic flux path 60 which includes the working air gap 58. Such magnetic flux attracts the rotor assembly 52 toward the stator assembly 54, according to well known principles of magnetism, and tends thus to urge the rotor assembly 52 either clockwise or counterclockwise to create the working torque output.

The rotary actuator 50 also includes an outer enclosure 64 (i.e., housing tube) having a hollow interior. The outer enclosure 64 houses the rotor assembly 52 and stator assembly 54 therein and is formed of a metallic material (e.g., steel) having a desirable magnetic reluctance value so as to form part of magnetic flux path 60. As shown in FIG. 4, the combination of the outer enclosure 64, the stator assembly 54, and the rotor assembly 52 forms three-dimensional flux path 60 in the rotary actuator 50. The flux path flows through the outer enclosure 64, through the stator assembly 54, into the rotor assembly 52, and eventually back to outer enclosure 64.

As shown in FIG. 4, stator assembly 14 is comprised of a plurality of metallic stator laminations 66. The plurality of stator laminations 66 are arranged and connected together to form a pair of stator lamination stacks 68, 70 that are fitted within outer enclosure 24 and positioned adjacent to rotor assembly 52. A first stator lamination stack 68 (i.e., a stator ring) is generally positioned at a first end 72 of outer enclosure 64 and a second stator lamination stack 70 is generally positioned at a second end 74 of outer enclosure 64. Working air gaps 58 are maintained between each stator lamination stack 68, 70 and rotor assembly 52 to allow for rotor assembly 52 to rotate relative to stator assembly 54 and create a working torque output. The size of the working air gap 58 is such that a reluctance of the air gap accounts for a minimal gain in reluctance that would impede flow of the magnetic flux flowing through flux path 20. As such, working air gap 58 can have a thickness of, for example, 0.008 inches (0.203 mm), although other suitable thicknesses are also envisioned.

Each of the plurality of stator laminations 66 is positioned such that it is oriented orthogonally to a centerline axis 76 of the rotary actuator 50 and outer enclosure 64. As such, magnetic flux flows through each of the plurality of stator laminations 66 in a direction, indicated by arrow 78, parallel to the general orientation of the stator lamination 66, and not perpendicularly therethrough. As the magnetic flux flows parallel through the length of stator lamination 66, the magnetic material properties of the lamination are used to minimize the amount of reluctance that is encountered in flux path 60.

Referring still to FIG. 4, rotor assembly 52 is shown as including a rotor core 80 and a pair of rotor lamination stacks 82, 84 each comprised of a plurality of rotor laminations 86. A first rotor lamination stack 82 is generally positioned at the first end 72 of outer enclosure 64 and a second rotor lamination stack 84 is generally positioned at the second end 74 of outer enclosure 64. The rotor lamination stacks 82, 84 can be secured to rotor core 80 by a press-fit and are positioned thereon such that they are positioned parallel to, and in-line with stator lamination stacks 68, 70. As shown in FIG. 2, working air gaps 58 separate rotor lamination stacks 82, 84 and stator lamination stacks 68, 70 such that magnetic flux flowing therebetween in flux path 60 attracts the rotor assembly 52 toward the stator assembly 54 to create rotation therebetween and generate a working torque output.

In operation, coil assembly 62 within the rotary actuator 50 receives a current to create an excitation current, which in turn creates a magnetomotive force (m.m.f.) to drive magnetic flux in flux path 60. The magnetic flux in flux path 60 originates at the outer enclosure 64 and continues into first stator lamination stack 68. The magnetic flux passes from first stator lamination stack 68, through working air gap 58, and into first rotor lamination stack 82. The magnetic flux then continues down the length of rotor core 80, flows into second rotor lamination stack 84, and across working air gap 58 into second stator lamination stack. The magnetic flux then returns to outer enclosure 64, thus forming and completing the three-dimensional flux path loop 60.

Figure 1:
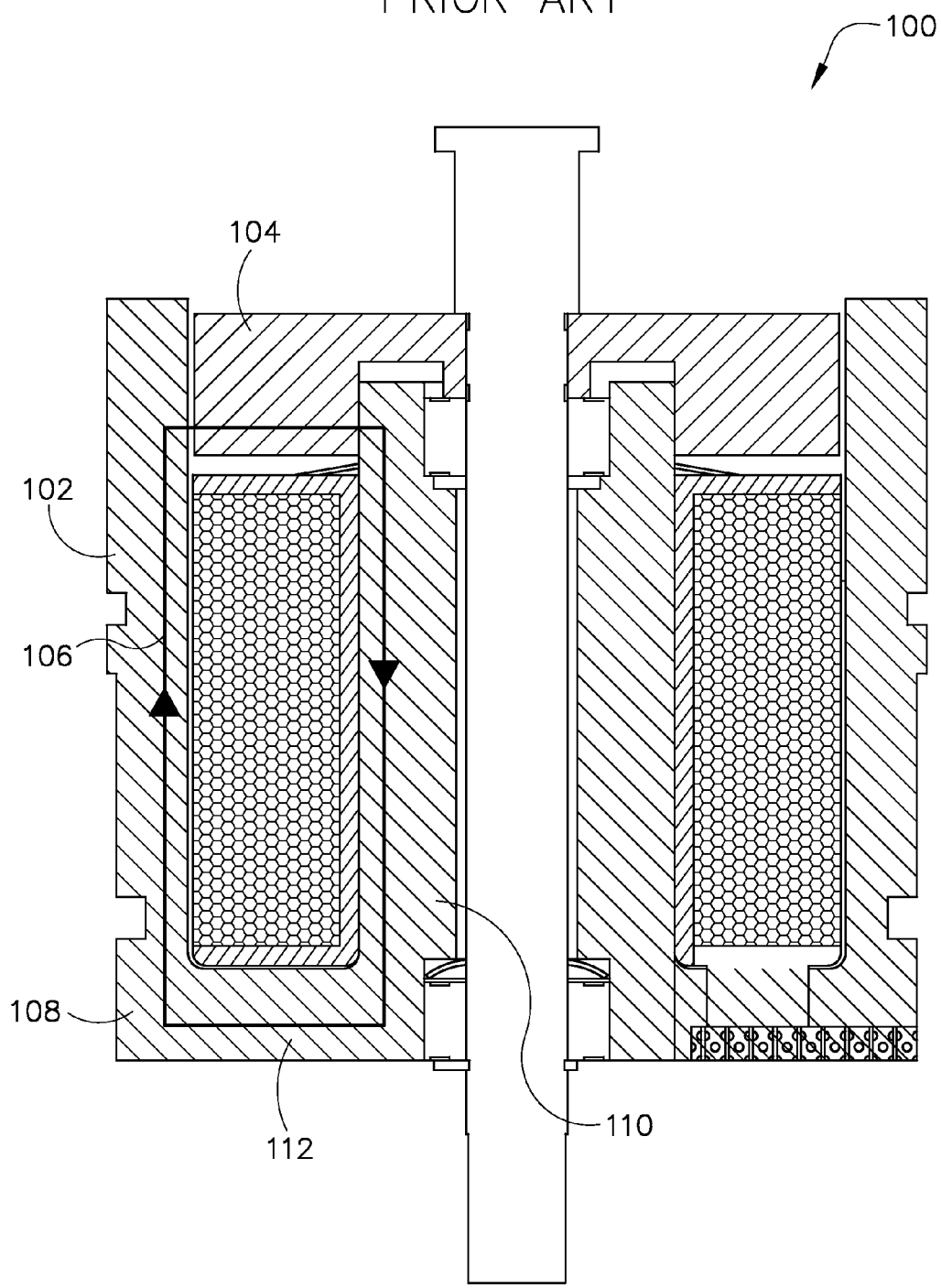
FIG. 1 is a cross-sectional view of a prior art rotary actuator.

As configured, rotary actuator 50 of FIG. 4 is designed to generate approximately twice the output torque as that generated by rotary actuator 10 in FIG. 2 and about five times (5×) the output torque density compared to that of the rotary actuator of FIG. 1. That is, by replacing the solid flux ring 42 in rotary actuator 10 (shown in FIG. 3) with the second stator lamination stack 70 and the second rotor lamination stack 84 (which together form a laminate flux ring 86), reluctance in the flux path 60 is significantly lowered, resulting in improved torque output in rotary actuator 50. Advantageously, the outer enclosure 24, 64 in rotary actuators 10, 50 are constructed and sized in the same manner, thus allowing for a plurality of actuator designs to be implemented within a common housing. Thus, simply by modifying the structure of the rotor assembly and stator assembly via the use of laminations and/or solid flux rings, the torque output of the rotary actuator 10, 50 can be designed as desired during the manufacturing process, without any modifications to the outer enclosure 24, 64 being necessary.

While the rotary actuators 10, 50 of the present invention have been described in terms of a fractional or limited angle torquer, it is envisioned that those skilled in the art will now be able to employ these techniques to other rotary type actuators to include the outer enclosure, rotor assemblies, and stator assemblies as set forth above. It is further envisioned that other forms of electric motors can also implement features of the present invention to improve flux path reluctance properties for generating increased output torque. Furthermore, while rotor assembly 12, 52 has been shown and described as including a rotor core and one or more rotor lamination stacks, it is also envisioned that rotor assembly 12, 52 could also be formed as a singular rotor component that is machined to have a one-piece construction. That is, when the rotor assembly is configured as an easy to manufacture shape, the rotary actuators 10, 50 of the present invention could incorporate metallic laminations for forming the stator assembly only.

Therefore, according to one embodiment of the present invention, a rotary actuator includes an outer enclosure and a stator assembly positioned within the outer enclosure. The rotary actuator also includes a rotor assembly positioned adjacent to the stator and configured to rotate relative thereto and about a centerline axis of the rotary actuator. Each of the outer enclosure, the stator assembly, and the rotor assembly are arranged to carry a magnetic flux therethrough.

According to another embodiment of the present invention, an electric motor includes an outer enclosure, a stator ring positioned within the outer enclosure, and an electromagnetic coil positioned adjacent the stator ring and within the outer enclosure. The electric motor also includes a flux ring positioned within the outer enclosure and oppositely from the stator ring and a rotor assembly positioned within the stator ring, the coil arrangement, and the flux ring. The rotor assembly is configured to rotate about a centerline axis of the electric motor and relative to the stator ring and the flux ring in response to a magnetic flux generated by the electromagnetic coil.

According to yet another embodiment of the present invention, a method for manufacturing a rotary actuator includes the steps of constructing a tube shaped outer housing and forming a stator assembly and a rotor assembly configured to be positionable within the outer housing, wherein at least one of the stator assembly and the rotor assembly are formed at least in part from a plurality of metallic laminations. The method also includes the step of positioning the stator assembly and the rotor assembly within the outer housing, with the stator assembly being separated from the rotor assembly by a working air gap such that the rotor assembly can rotate relative to the stator assembly to generate an output torque.

According to still another embodiment of the present invention, a rotary actuator includes a multi-piece stator arrangement and a rotor assembly positioned adjacent to the multi-piece stator arrangement configured to rotate relative thereto and about a centerline axis of the rotary actuator. A torque is generated by flow of a magnetic flux through the multi-piece stator arrangement and the rotor assembly.

The present invention has been described in terms of the preferred embodiment, and it is recognized that equivalents, alternatives, and modifications, aside from those expressly stated, are possible and within the scope of the appending claims.

What is claimed is:

1. A rotary actuator comprising:
    an outer enclosure;
    a stator assembly positioned within the outer enclosure and comprising a plurality of stator laminations, each of the plurality of stator laminations having a lamination face oriented orthogonally to a centerline axis of the rotary actuator;
    a rotor assembly positioned adjacent to the stator assembly and configured to rotate relative thereto and about the centerline axis of the rotary actuator;
    wherein each of the outer enclosure, the stator assembly, and the rotor assembly are arranged to carry a magnetic flux therethrough, with each of the plurality of stator laminations being configured to carry the magnetic flux therethrough in a direction parallel to the lamination face of the stator lamination;
    wherein each of the plurality of stator laminations consists of two oppositely positioned pole faces thereon that are separated from the rotor assembly by a working air gap; and
    wherein the rotor assembly includes a rotor core and a plurality of rotor laminations press-fit onto the rotor core, with each of the plurality of rotor laminations consisting of a pair of faces aligned with the pole faces of each of the plurality of stator laminations, such that the rotor assembly is caused to rotate relative to the stator assembly within a pre-determined range of rotation that is less than 360 degrees.

2. The rotary actuator of claim 1 wherein the plurality of stator laminations comprises at least one of:
    a first stator lamination stack generally positioned at a first end of the outer enclosure; and
    a second stator lamination stack generally positioned at a second end of the outer enclosure.

3. The rotary actuator of claim 1 wherein the plurality of rotor laminations are positioned adjacent to the plurality of stator laminations and parallel thereto, such that each of the plurality of rotor laminations is configured to carry the magnetic flux therethrough in a direction parallel to a lamination face of the rotor lamination.

4. The rotary actuator of claim 1 wherein the plurality of rotor laminations comprises at least one of:
    a first rotor lamination stack generally positioned at a first end of the outer enclosure; and
    a second rotor lamination stack generally positioned at a second end of the outer enclosure.

5. The rotary actuator of claim 4 wherein, when the plurality of stator laminations comprises the first stator lamination stack and the second stator lamination stack, and the plurality of rotor laminations comprises the first rotor lamination stack and the second rotor lamination stack, the rotary actuator produces an output torque approximately twice that of when the plurality of stator laminations comprises just the first stator lamination stack and the plurality of rotor laminations comprises just the first rotor lamination stack.

6. The rotary actuator of claim 1 wherein the outer enclosure, the stator assembly, and the rotor assembly form a three dimensional flux path to carry the magnetic flux therethrough.

7. The rotary actuator of claim 6 further comprising a solid flux ring, the solid flux ring being positioned between the rotor assembly and the outer enclosure to form part of the three dimensional flux path.

8. An electric motor comprising:
    an outer enclosure;
    a stator ring positioned within the outer enclosure, the stator ring comprising a first stator lamination stack that includes a plurality of stator laminations oriented orthogonally to the centerline axis such that the magnetic flux flows through each of the plurality of stator laminations in a direction parallel to a surface of the stator lamination, wherein each of the plurality of stator laminations consists of two oppositely positioned pole faces thereon;
    an electromagnetic coil positioned adjacent the stator ring and within the outer enclosure;
    a flux ring positioned within the outer enclosure and oppositely from the stator ring; and
    a rotor assembly comprising a first rotor lamination stack positioned adjacent to the stator ring and a rotor core affixed to the rotor lamination stack, the rotor assembly configured to rotate about a centerline axis of the electric motor and relative to the stator ring and the flux ring in response to a magnetic flux generated by the electromagnetic coil;
    wherein the stator ring, the flux ring, and the rotor assembly are constructed so as to form a first working air gap between the stator ring and the first rotor lamination stack and a second working air gap between the flux ring and the rotor core; and
    wherein the first rotor lamination stack includes a plurality of rotor laminations press-fit about the rotor core, with each of the plurality of rotor laminations consisting of a pair of faces aligned with the two oppositely positioned pole faces of the stator laminations, such that the rotor assembly is caused to rotate relative to the stator ring within a pre-determined range of rotation that is less than 360 degrees.

9. A rotary actuator comprising:
    a multi-piece stator arrangement including:
        a metallic outer enclosure; and
        at least one stator lamination stack positioned within the metallic outer enclosure and press-fit thereto and comprising a plurality of stator laminations oriented orthogonally to a centerline axis of the rotary actuator;
        wherein each of the plurality of stator laminations consists of two oppositely positioned pole faces thereon; and
    a rotor assembly positioned adjacent to the multi-piece stator arrangement and configured to rotate relative thereto and about the centerline axis of the rotary actuator;
    wherein a torque is generated by flow of a magnetic flux through the multi-piece stator arrangement and the rotor assembly, such that an interaction between the two oppositely positioned pole faces of the stator laminations and the pair of faces of the rotor assembly causes the rotor assembly to rotate relative to the stator arrangement within a pre-determined range of rotation that is less than 360 degrees; and wherein the rotor assembly comprises:
  a rotor core;
  at least one rotor lamination stack press-fit onto the rotor core and positioned adjacent to the at least one stator lamination stack and parallel thereto; and
  wherein the at least one rotor lamination stack comprises a plurality of rotor laminations oriented orthogonally to the centerline axis, with each of the plurality of rotor laminations consisting of a pair of faces aligned with the two pole faces of the stator laminations.

10. The electric motor of claim 8 wherein the first working air gap and the second working air gap are located at different concentric locations relative to the centerline axis.

11. The rotary actuator of claim 1 wherein each of the pair of faces of the rotor assembly is sized to correspond to a size of the pole faces of the stator laminations.

* * * * *